W. L. ADLAM.
SANITARY MEAT RACK.
APPLICATION FILED NOV. 24, 1909.
959,685.
Patented May 31, 1910.
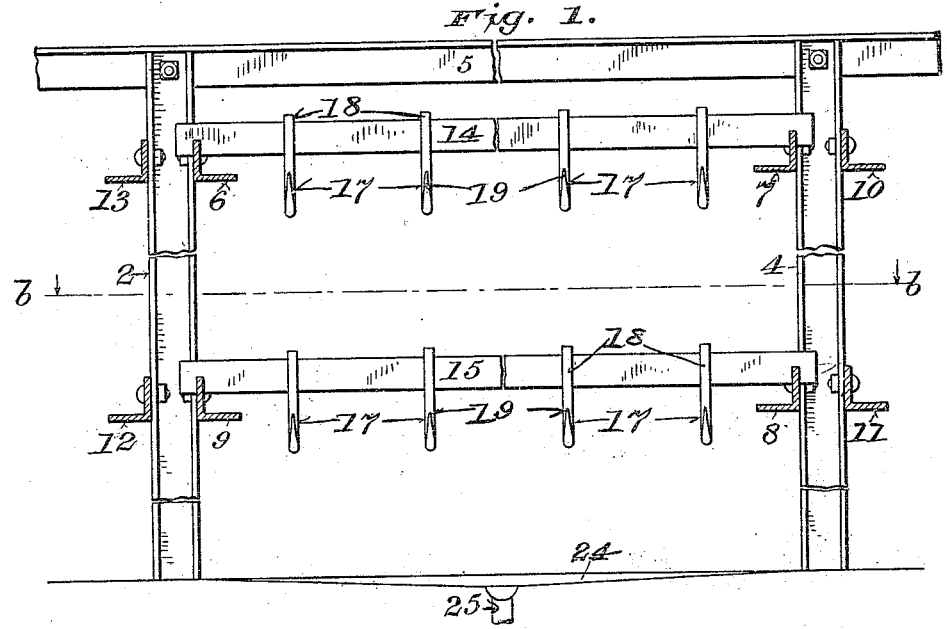
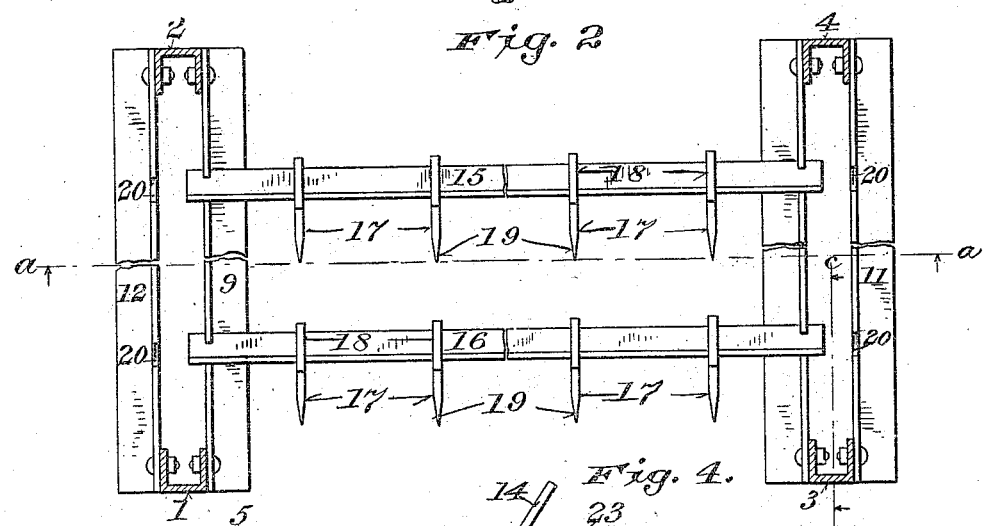
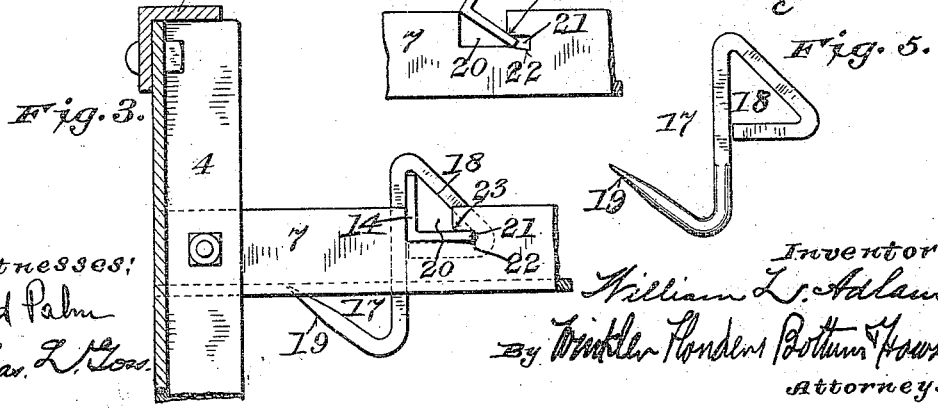
Witnesses:
Inventor:
William L. Adlam,
Attorneys.

UNITED STATES PATENT OFFICE.

WILLIAM L. ADLAM, OF MILWAUKEE, WISCONSIN.

SANITARY MEAT-RACK.

959,685.  Specification of Letters Patent.  Patented May 31, 1910.

Application filed November 24, 1909. Serial No. 529,679.

*To all whom it may concern:*

Be it known that I, WILLIAM L. ADLAM, a citizen of the United States, residing at Milwaukee, in the county of Milwaukee and State of Wisconsin, have invented certain new and useful Improvements in Sanitary Meat-Racks, of which the following is a specification, reference being had to the accompanying drawing, forming a part thereof.

This invention relates to meat racks, and the purpose of the invention is to provide a perfectly sanitary rack for holding all kinds of meats, &c., the main features of the invention being the provision of readily removable parts which may be easily assembled and disassembled while at the same time the several parts are so constructed and arranged that when the hooks are to be used they are firmly held in substantially fixed rigid positions.

Referring to the drawings which accompany this specification and form a part thereof, on which drawings the same reference characters indicate the same elements wherever they may appear on each of the several views, and which drawings illustrate an embodiment of this invention, Figure 1 is a sectional elevation taken on the line *a—a* of Fig. 2; Fig. 2 is a horizontal section taken on the line *b—b* of Fig. 1; and Figs. 3, 4 and 5 are elevations of details, Fig. 3 being a sectional elevation on the line *c—c* of Fig. 2.

In order that meat racks may be sanitary and may be readily cleansed, it is necessary that parts with which meat &c. may contact shall be readily removable so as to be easily cleansed.

Meat &c. is usually hung upon hooks or the equivalent of hooks in the slaughter houses and packing houses, while being transported and while being preserved for use, and where large quantities of meat are handled it is quite essential that the hooks upon which it is hung shall be held quite rigidly so as to avoid loss of time as well as to prevent annoyance.

Generally speaking this invention provides supports with which hook members may be readily engaged, so that they will be held rigidly. The hook members carry hooks which are removably secured thereto and which are nonrotatable with respect thereto.

Referring to the drawings, the numerals 1, 2, 3 and 4 designate uprights of a frame which may be constructed in any suitable manner, but preferably it should be constructed of metal and preferably of galvanized iron or steel, as meat rooms and safes are always more or less damp. The supports, hook members and hooks should also preferably be made of galvanized iron or steel so that they will not rust because of the damp location and when being cleaned by soaking them in boiling water. The uprights 1, 2, 3 and 4 shown by the drawings may be multiplied indefinitely and may be secured together by stringers 5, or in any other preferred manner.

Secured to the uprights 1, 2, 3 and 4, are supports 6, 7, 8, 9, 10, 11, 12 and 13, as shown by the drawings. These supports are preferably made from angle iron as shown, on account of its stiffness, but any other form of material may be employed. The supports are provided with means for holding the hook members rigid, so that they cannot turn, and for cheapness and convenience of manufacture the hook members 14, 15 and 16 are also made of angle iron. The hooks 17, which are adapted to be removably supported by the hook members, are made of any appropriate shape to be nonrotatably supported by the hook members, as for example, being provided with a triangular shaped part 18 adapted to encircle a hook member and being provided with the hook point 19. When angle iron is used for the hook members, a simple and convenient means for preventing their turning is provided by forming slots 20 in the supports with an undercut part 21, as clearly shown by Figs. 3 and 4 of the drawings, the undercut part 21 of the slot 20 being at the opposite side of the hook members from the points 19 of the hooks. With this construction the hook members can be readily disengaged from the supports or engaged therewith by tipping said hook members into or out of slots 20 and recess 21, as clearly shown by Fig. 4 of the drawings. To facilitate the removal and replacing of the hook members, the bottom of the extremity of the recess 21 may be cut away a little as designated on Fig. 4 of the drawings by the numeral 22, and the sharp point or angle between recess 21 and slot 20 may be rounded off as indicated on Fig. 4 of the drawings by the numeral 23.

With a construction such as that described, the hooks can all be removed from the hook members and thrown into boiling water for cleansing, the hook members themselves can be removed from their supports and be thoroughly cleaned, and if it is necessary or desirable to cleanse the frame work, it can be readily cleaned by means of a hose. In packing houses and other establishments the frames will usually be supported above a concrete floor 24, which can be readily drained on account of its being inclined to a drain 25, for example.

As many supports and as large a frame can be used as is required, and the drawings show the additional supports 10, 11, 12 and 13 as provided for receiving other hook members, not shown, and of course it is apparent that the supports can be arranged so that the hook members will be staggered with respect to each other or not, as is desired, this being a matter which will depend upon the character of the meat to be hung upon the hooks,—all of which however, is well understood by those engaged in handling meat, &c.

Of course it is obvious that many changes can be made by mechanics to vary the exact details of construction which I have preferred to illustrate and describe, but I wish it to be distinctly understood that I do not limit myself to the specific structures illustrated and described, as I consider my invention to include all constructions which fall within the scope of the claim appended hereto.

What is claimed is:

In a sanitary meat rack the combination with angle iron hook members of hooks provided with a triangular part adapted to be removably placed upon said hook members, supports for said hook members, said supports being provided with recessed notches adapted to receive said angle iron hook members to prevent them from tipping.

In witness whereof I hereto affix my signature in presence of two witnesses.

WILLIAM L. ADLAM.

Witnesses:
 CHAS. L. GOSS,
 ALICE E. GOSS.